US007423527B2

(12) United States Patent
Bajwa et al.

(10) Patent No.: US 7,423,527 B2
(45) Date of Patent: Sep. 9, 2008

(54) RADIO FREQUENCY IDENTIFICATION (RFID) NETWORK SYSTEM AND METHOD

(75) Inventors: Raminder Singh Bajwa, Palo Alto, CA (US); Sanjeev Dharap, Palo Alto, CA (US); Anurag Mendhekar, Los Altos, CA (US); Pavithra Reddy Moranganti, Sunnyvale, CA (US); Radhika Muralidharan, Sunnyvale, CA (US)

(73) Assignee: Blue Vector Systems, Mountain View, CA (US)

( * ) Notice: Subject to any disclaimer, the term of this patent is extended or adjusted under 35 U.S.C. 154(b) by 11 days.

(21) Appl. No.: 11/056,561

(22) Filed: Feb. 10, 2005

(65) Prior Publication Data

US 2005/0198228 A1 Sep. 8, 2005

Related U.S. Application Data

(60) Provisional application No. 60/544,713, filed on Feb. 13, 2004.

(51) Int. Cl.
*G08B 1/08* (2006.01)
(52) U.S. Cl. .............................. 340/539.16; 340/539.1; 340/10.1; 340/10.32; 340/286.02
(58) Field of Classification Search ............ 340/539.16, 340/539.1, 539.13, 572.1, 10.1, 10.32, 286.02
See application file for complete search history.

(56) References Cited

U.S. PATENT DOCUMENTS

| 6,340,932 | B1 | 1/2002 | Rodgers et al. | .......... 340/572.7 |
|---|---|---|---|---|
| 6,450,411 | B1 | 9/2002 | Rash et al. | ................ 236/44 A |
| 6,509,828 | B2 * | 1/2003 | Bolavage et al. | ........... 340/10.1 |
| 6,584,375 | B2 | 6/2003 | Bancroft et al. | ............. 700/213 |
| 6,731,198 | B1 * | 5/2004 | Stobbe et al. | ............ 340/10.33 |
| 7,038,584 | B2 * | 5/2006 | Carter | ................... 340/539.13 |

OTHER PUBLICATIONS

Ken Traub et al., *The Application Level Events (ALE) Specification*, Version 1.0 (2005).
International Search Report and Written Opinion for PCT/US05/04674 dated Aug. 4, 2006.

\* cited by examiner

*Primary Examiner*—Davetta W. Goins
(74) *Attorney, Agent, or Firm*—DLA Piper US LLP

(57) ABSTRACT

A bidirectional radio frequency identification (RFID) network system and method are presented. The system allows users to configure, monitor, and manage different sensor devices by using a graphical user interface real-time. The reconfiguration is done through a network management computer at the top system level that receives user input, generates code images according to the user input, and appropriately routes the code images to sensor routers that directly control the sensors. If the system is multi-layered, some code images are also sent to the intermediate-level network management computers. The system allows users to not only monitor a business flow but react to problematic situations quickly by adjusting the workflow. The aspect-oriented nature of the system allows users to reconfigure the system based only the Functionality aspects without worrying about the Partitioning aspects (e.g., how the network and the sensors are physically connected).

35 Claims, 4 Drawing Sheets

RADIO FREQUENCY IDENTIFICATION (RFID) NETWORK SYSTEM AND METHOD

RELATED APPLICATION

This application claims the benefit of U.S. Provisional Application Ser. No. 60/544,713 filed on Feb. 13, 2004, which is incorporated by reference herein in its entirety.

FIELD OF THE INVENTION

The invention relates generally to a computer-implemented system and method for managing radio frequency identification ("RFID") networks and in particular to a system and method for deploying and managing RFID networks and processing and managing the data generated by RFID tags and other devices/sensors.

BACKGROUND OF THE INVENTION

With the increasing proliferation of cost-efficient and powerful computing and communications capabilities comes the ability to deploy sensors and link them to a network. The benefits of this link is obvious in some areas, for example in enterprises like supply chain management (SCM). A supply chain includes manufacturing centers, transportation fleets, warehouses/distribution centers and retail/wholesale outlets. Information about goods in the retail/wholesale outlets, for example, can be obtained from a remote computer that is connected to the sensors that track the goods.

Current object tracking solutions are based on bar codes and the use of bar code readers. A bar code system requires bar codes to be in good condition and must be in the line-of-sight of the readers. The wear and tear on labels and the difficulty of guaranteeing that the label is presented appropriately to the reader are major hindrances to increased automation as they often require human intervention. Since human intervention is required during normal operation, the workers could detect and remedy incorrect or faulty operation of the devices/system. RFID technology offers a more reliable solution than bar codes and lends itself to automatic operation (i.e., with reduced human involvement) because the radio frequency technology is less sensitive to factors like the condition and the position of the sensor devices. Further, RFID can monitor devices at a higher rate than bar codes, thereby allowing an increase in the throughput of goods and services when the existing infrastructure is coupled with RFID. Since no operator is needed on site for an RFID-based operation, the operation is usually monitored from a remote terminal that is linked to the sensor device, through a data network.

A problem with the currently available RFID data network system is that information only travels in one direction, from the RFID sensors to the monitoring terminal. Thus, although the user can see that something problematic is happening, there is no method in the system for addressing the problem real-time. For example, a user may see that a package is traveling on a wrong route based on the tracking done by the RFID sensors. However, there is not much the user can do to correct the route when he sees the problem. By the time he can re-route the package, for example through a series of phone calls that eventually reach the delivery truck driver, the package may have already arrived at the wrong destination.

Although a post-mortem analysis of what happened might provide useful information for future implementation, the data would be much more useful if something could be done about a problematic event more promptly. An organized method that allows quick perception and prompt response to a complex situation is desired. Since computing power and sensor devices have become cost-effective and readily available, large numbers of sensors can be deployed to provide superior resolution. By employing the appropriate numbers of sensors and computers/networks, an infrastructure that can 1) support a large number of sensors of diverse capabilities; 2) provide easy configuration and rapid deployment and networking of the sensors; and 3) provide a simple one-stop solution to configuring and managing the sensors.

The software standards set by standards bodies, such as the Auto-ID center defined Savant based architecture, are designed to handle EPCGlobal data and form the basis of most RFID solutions today. However, these solutions are unable to handle generic event data and are limited by their adherence to a narrow standard. The inflexible adherence to the standard restricts their ability to scale up to larger, more diverse implementations made up of heterogeneous sensor devices.

Since the value and the utility of the information from the sensor often reside in the relationships between the data, a solution that can deploy, manage and process data in order to extract information, and in some cases even act on the data to facilitate the business activities of the enterprise, is needed. Such a system that can interface and interact with existing systems is desired. The system is preferably agile and scalable so that it can evolve along with the changing needs of the enterprise.

SUMMARY OF THE INVENTION

In one aspect, the invention is a system for communicating with remote devices. The system includes a primary network management computer, a sensor router, and a plurality of sensors that are controlled by the sensor router. The primary network management computer, which is coupled to a user interface, receives user instructions and generates code images. The sensor router receives the code images from the primary network management computer and applies the code images to a plurality of sensors. Data travels bidirectionally between the primary network management computer and the plurality of sensors according to the user instructions.

In another aspect, the invention is a system for communicating with remote devices. The system includes a user interface for receiving user instructions and a configuration management system that is coupled to the user interface. The configuration management system generates code images according to the instructions. A plurality of RFID sensors are remotely coupled to the network management computer and controlled by the code images. The plurality of RFID sensors exchange data with the configuration management system bidirectionally.

In yet another aspect, the invention is a method of communicating with remote sensors by receiving a user instruction from a user interface, generating code images according to the user instruction, and applying the code images to the sensors to define a condition under which the sensors are to generate a signal. The signal is processed upon generation and fed to the user interface.

The invention also includes a method of configuring remotely located sensors. The method entails receiving configuration information from a user interface, parsing the configuration information to extract aspect annotations, retrieving physical layout data from a database, and combining the annotations with the physical layout data to generate a code image for the remotely located sensors. The remotely located sensors generate signals according to the configuration information.

DETAILED DESCRIPTION OF THE EMBODIMENTS

Figure 1:
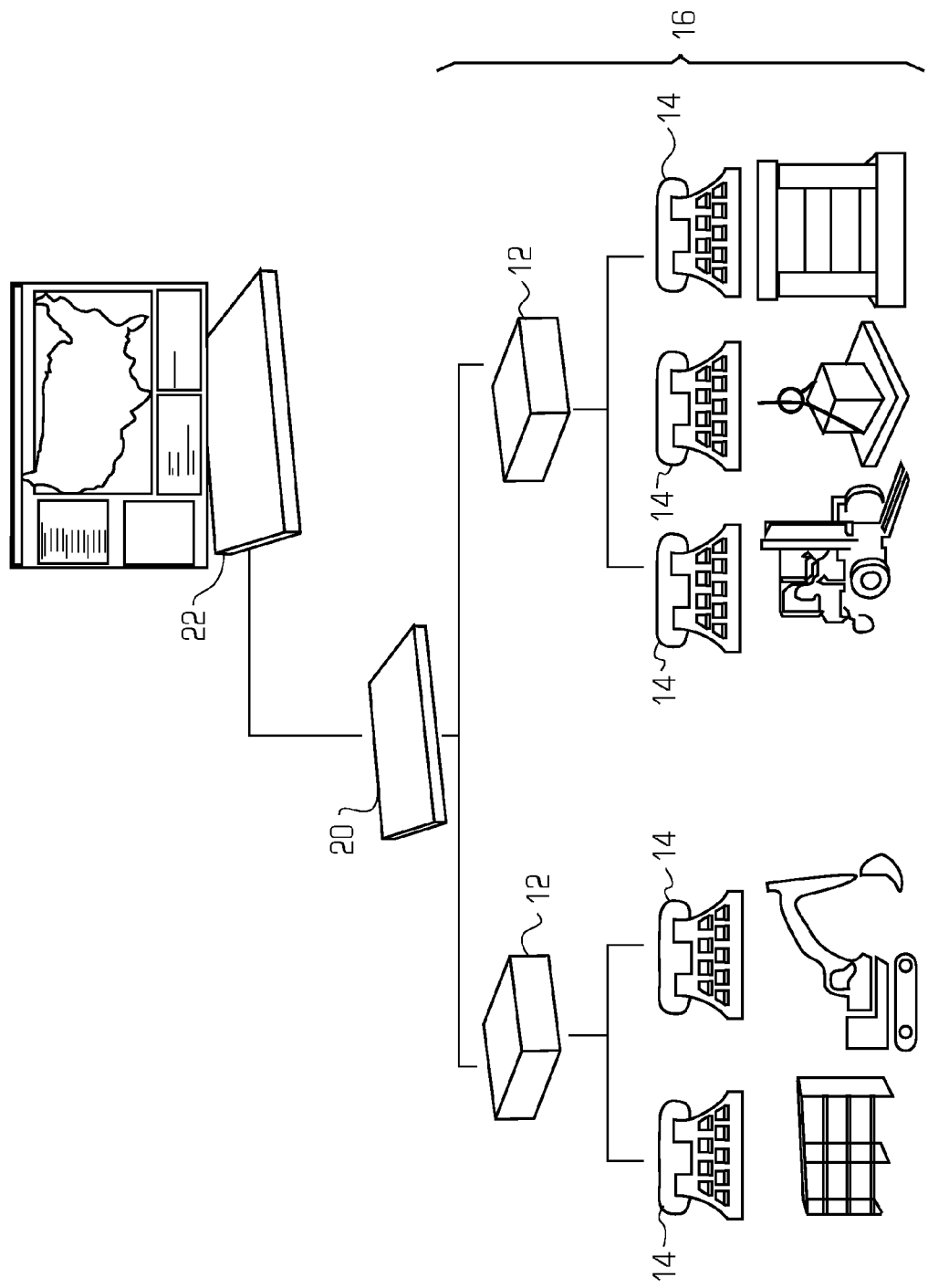
FIG. 1 is a diagram illustrating an RFID system in accordance with the invention.

The invention is particularly applicable to monitoring and tracking of goods in a supply chain or a distribution network, starting at the manufacturer and proceeding all the way to the end customer. The invention is described in the monitoring and tracking context and, specifically, in the context of a system that employs radio frequency identification (RFID) tags. It will be appreciated, however, that a system in accordance with the invention has greater utility. For example, the invention may be used in applications where the input stimuli is not necessarily the output of a sensor probing the physical environment. It can be applied to monitoring and managing stock market operations, where instead of RFID events there are stock transactions. In the stock market context, the system can monitor whether regulatory requirements are being met. In another example, the invention may be used to track travelers entering and leaving the country by scanning their documents and generating events and exceptions in accordance with whether they are adhering to travel-related laws.

A "computer," as used herein, is intended to mean any electronic unit having a processor, a memory, and one or more portals for connecting to other devices. A "sensor" is intended to mean any device that generates a signal when a predefined condition is detected or read, and includes but is not limited to an RFID-tag sensor/reader.

The system is configured by a web-based management system that is a Graphical User Interface to a specification system based upon an Aspect-Oriented Processing Engine designed to support large-scale distributed systems. The engine consists of a specialized compile-time source-code transformation system that takes in multiple descriptions of various aspects about the system and merges these descriptions into code-images that run individually on each of the participating computers in the distributed system. These aspects include: network hierarchy (which computer is connected to what), network characteristics (what kinds of links connect the computers), physical layout (how the computers are arranged in the context of a physical deployment), functionality (what the system actually needs to do), system health (information about the state of the system), data quality (what to do to make sure that the data coming out of the system is error-free). The Aspect-oriented processing engine allows programmers to specify each of these aspects independently, allowing very rapid configuration and customization of the underlying distributed computing system. Further, the functionality aspect itself is broken up into programmer selectable sub-aspects (called behaviors) which can be combined to create complex behaviors or schema. A behavior can be used as an abstract building block of the user application. Behaviors are configurable and have parameters attached to then that then make them very flexible and applicable to a vast range of applications.

A business process or a sub-section thereof can be represented in the abstract or formally as a schema, constructed by the user using appropriate behaviors. The schema must be parsed and transformed into a logical overlay; this only requires knowledge of the building blocks and the processing dependencies and constraints. This logical overlay has to be mapped onto the network of sensors and processing nodes (physical overlay), which would require knowledge of the organization of the sensors, the routers and the network management computer nodes and the zone hierarchy mapped onto them. The drag and drop GUI allows for a quick setup and efficient scaling up of the system. With the aspect oriented programming approach, once the specifications are provided in terms of the various system aspects, the aspect oriented engine then merges the requirements to create the solution. The aspect oriented server can then distribute the code images to relevant (only for those for whom the code images have changed) components of the network. This results in a self-configuring and self-managing system once the user has specified their requirements in terms of the aspects. Should it become necessary, additional aspects can be easily added to the system.

One of the advantages of the RFID system described herein is that it allows bidirectional communication between the monitoring terminal and the sensor devices. Like in the conventional systems, sensor devices send data to the monitoring stations. In addition, the system of the invention allows users to send configuration instructions to the sensor devices to reconfigure the devices as they wish. In more detail, the computers in the network connects to and acquire data from the sensor devices, convert the data/events to business information in accordance with prescribed workflows/schemas reliably, and route them appropriately. Additionally, the system allows the sensor devices to be configured, monitored and managed from a remote location.

The system has high reliability and robust operation with the ability to recover from partial/local crashes or disruptions in the network. Given that needs and requirements evolve over time, the system provides easy re-configuration of a deployed system and modifications in its workflow/schema in support of process evolution. The system also allows a user to instrument and gather data on the performance of the system so that changes and improvements in the system can be quantified. The instrumentation and data gathering capabilities of the system are also applicable in troubleshooting and debugging.

Another advantage of the system is that it is usable with a heterogeneous mixture of sensor devices at once, unlike the currently available RFID-tag network systems. The system may include connectivity software that is capable of connecting to legacy systems and mixed equipment environments. This flexibility is especially useful when using the invention with an RFID system because RFID systems are generally applicable to a wide range of applications such as financial transaction, widgets on a production line, or regulatory requirements. The main difference between the RFID systems in these different applications is in the characteristics and types of sensor devices in the RFID system including the type of data being gathered.

The system also provides monitoring, device driver/control system diagnostics, alerts and notifications. Further, the system provides remote/on-line maintenance, upgrades, extensions, reconfiguring and/or redeployment of devices in the system. The system has self-healing capabilities such as the ability to (re)download the proper code images after a crash, and redundant mechanisms for backup. The system also has data monitoring and management capabilities that permit the system to perform data aggregation, synchronization and integration functions, real-time event monitoring, multi-protocol, format negotiations, and automated decision-making support tools. The system also has data storage, migration and resolution management tools, and application development environment/tools that allow a user to create an application. Thus, the system may include application and task authoring tools and a rich library of building blocks. The system also has device/application/system performance monitoring tools.

The invention provides a system and method for remotely monitoring and/or tracking objects and events. Unlike the currently existing solutions, the invention comprehensively addresses the requirements of rapid, large deployments, central management of resources, rich application development capabilities, streamlined operations management and flexible interfacing with legacy and partner applications. Current solutions focus on performing tasks such as interfacing with RFID readers, performing filtering operations on data, and basic management of readers but lack the ability to rapidly configure and deploy a network or provide ongoing real-time monitoring of objects.

Generally, the invention(s) presented herein allows the design of solutions where data from a variety of sensors can be collated to generate information for business processes in a seamless and uniform manner without restriction on the scale or type of operation.

System and Network Architecture

FIG. 1 is a diagram illustrating an RFID system 10 in accordance with the invention. The system includes one or more RFID routers 12 that interface with one or more sensors 14. Some of the sensors 14 are coupled to a Network Management Computer 20, which controls the communication between a user interface 22 and the RFID routers 12, and ultimately between the user interface 22 and the sensors 14. The group of RFID routers 12 that are controlled by a single Network Management Computer 20 form a domain 16. The RFID reader/sensors 14 that are connected to one RFID router 12 can have varying capabilities and uses. Thus, unlike the currently available systems, the RFID router 12 can be connected to a heterogeneous mix of sensors 14 at the same time as long as the sensors 14 are capable of communicating digitally. Besides RFID sensors, the sensors 14 may be GPS devices, temperature sensors, pressure sensors, etc.

Figure 2:
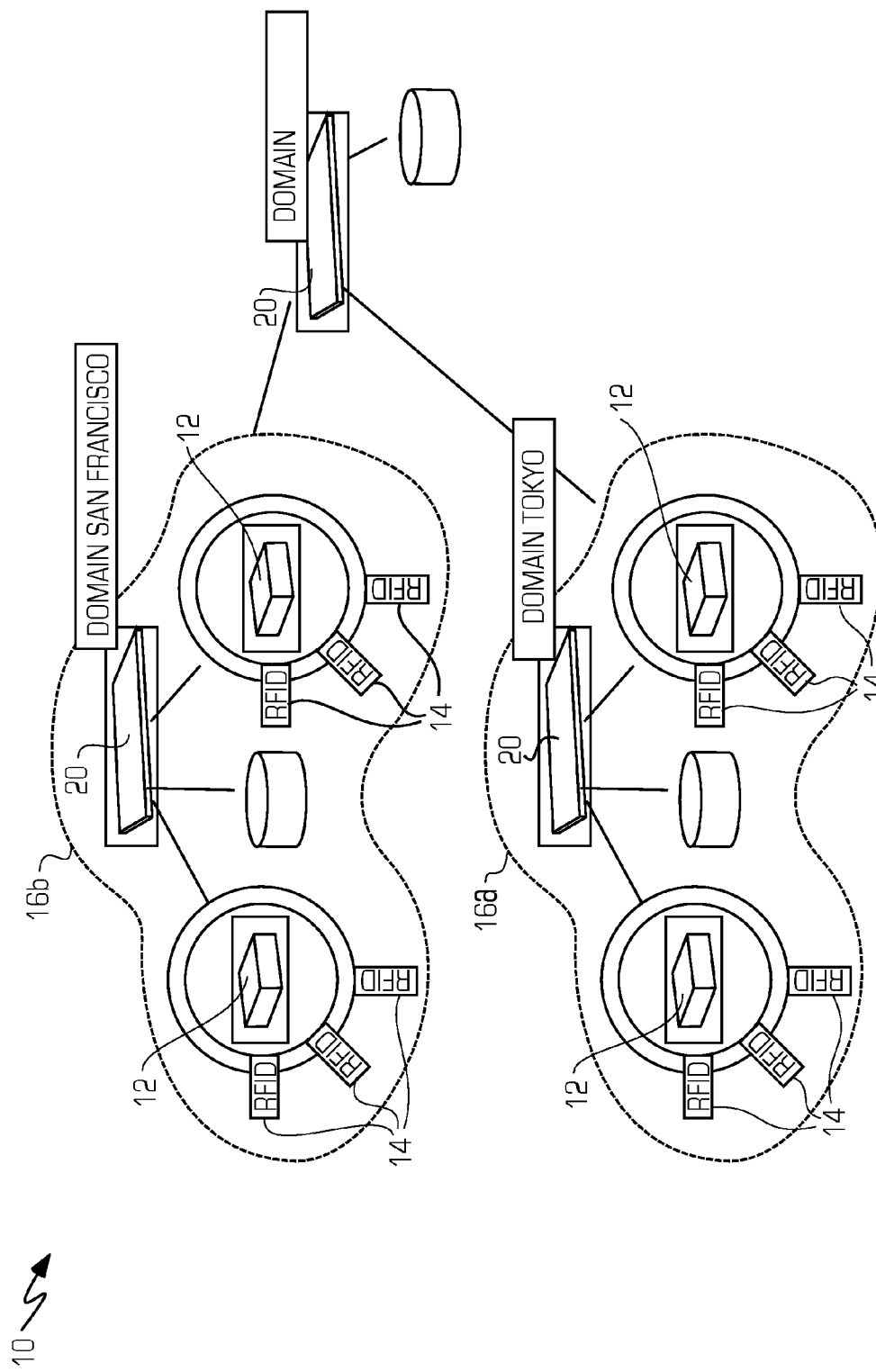
FIG. 2 is a diagram illustrating that network management computers may be connected with one another other to form a larger network.

FIG. 2 illustrates that network management computers 20 may be connected with one another other to form a larger (e.g., worldwide) domain that includes all of the individual domains 16. The example shown in FIG. 1 includes a Tokyo domain 16a and a San Francisco domain 16b that are connected together to form a worldwide domain. The connections between the sensors 14 and the RFID routers 12, between the RFID routers 12 and the network management computers 20, and among different network management computers 20 need not be direct or wired connections. For example, these connections can be over the Internet. The communications between the devices mentioned above takes place by using standard, well-known internet protocols. The links between the various devices and application shown in FIG. 2 can be any type of communications link, such as wired or wireless connections or any combination of the two.

FIG. 2 illustrates that the network management computers 20 may be arranged in layers, or "zones" that are each controlled by a set of network management computers 20. The embodiment of FIG. 1 is a single-layered configuration whereby one network management computer 20 controls all the sensors 14. In contrast, in the multi-layered embodiment of FIG. 2, each domain 16a, 16b is controlled by a first layer of network management computer 20, and both of the domains 16a, 16b are controlled by a second layer of network management computer 20. Formation of zones makes it easy to control the sensors 14 because specific aspects and behaviors can be associated with particular zones. For example, in the embodiment of FIG. 2, a certain set of aspects and behaviors that are intended for the sensors 14 in Tokyo can be directed specifically to the network management computer 20 that controls the Tokyo domain 16a. The San Francisco domain 16b will remain free to be associated with its own set of aspects and behaviors.

One or more RFID routers 12 may form a domain 16 wherein the RFID routers 12 in the domain are connected to a network management computer 20. Each RFID router 12 is used to interface with, communicate and modify the configurations of sensors 14 that are connected to it. The RFID router 12 can issue commands/requests to the reader devices and the readers/devices then respond accordingly and/or the devices/sensors may asynchronously (independent of a specific command-response sequence and determined only by the configuration) communicate changes in its environment to the RFID router. In yet more detail, the RFID router 12 is a network element that can configure readers/sensor devices, monitor them, process data received from them and work in concert with the network management computer 20 to perform system operations. The RFID routers 12 come with a rich set of interconnections allowing it to interface with sensors 14 over a wide range of interconnections including but not restricted to Serial interfaces, Ethernet, and wireless. Likewise, the RFID routers 12 can communicate with the network management computer 20 using wired or wireless-interconnect.

The network management application 20 is the device through which the system is deployed and customized, and applications developed. The network management computers 20 also participate in the execution of the application and system functions. The network management computers 20 are capable of web-based management and operations using a drag-and-drop user interface for RFID configuration. It provides authentication for multi-user support. The configuration/customization features provide customizable data quality management and supports creation of new process and integration of existing business processes.

In accordance with the invention, the network/system may be hierarchically partitioned into one or more zones. A zone is an aggregation unit that can include one or more devices and can have configuration parameters, conditions/operations and behaviors attached to them. The zones are used to logically partition the RFID network for purposes of structured data processing and management. In accordance with the invention, the zones are hierarchically composed, i.e., a zone can be made up of other zones (sub-zones). The sub-zones cannot be split among zones. In a preferred embodiment, a zone can have only one parent zone, except when it is the root zone then it has no parent. In a preferred embodiment, there is no limit on the number of children a zone can have. In accordance with the invention, the zones (along with the devices and operations) can be replicated by copying.

Workflow

The system in accordance with the invention advantageously includes a mechanism to represent a process to be performed or modeled using the system. This modeling, representation and specification are termed the schema or workflow which can be hierarchically composed. The schema is not restricted to user business processes and this is specified in terms of the parameters of the different aspects. A workflow will, in general, be a specific sequence of operations which may include one or more of the following: the detection of events and monitoring of conditions, accessing data typically by querying, performing specific tasks, producing information in specified formats and some form of notification. The sequencing of the operations or the dependency of the operations can be time constrained.

A workflow/schema is composed of a number of smaller or sub-workflows/sub-schemas. Most are generic operations but often they are special processes or flows defined by standards, industry specific regulations, etc. A number of such building blocks are encapsulated and provided for rapid mapping of the user's business process into a workflow/schema. Such building blocks are an encapsulation of a sequence of actions to be taken when preset conditions are fulfilled. This encapsulation is available as a building block to be used in the design of the overall solution. It can be represented as a collection of different aspect specifications, which is herein referred to as a Behavior. A Behavior addresses very specific tasks that a collection of aspects might be able to accomplish. A Behavior is not limited to operate on data/events produced by the readers/sensors. A Behavior can take secondary events as inputs as well as external or user input. Thus, a Behavior may be used to configure the system or parts of it. In general, a programmer can annotate the Physical Layout with Behaviors as a convenient method to accomplish frequently needed tasks. For example, a counter Behavior is simply a counter. The stimulus for the Behavior counter can be specified as a particular event (perhaps an exception event). This association can be defined through the web interface as an annotation of the Physical Layout. During operation, each time the exception takes place the counter increments. By querying the counter periodically, a log can be maintained. The Behaviors can be combined and associated in a LEGO-like fashion to construct more complicated processes.

An operation is usually triggered by an event. The primary sources of events are the readers/sensors 14. The responses from sensors 14 that are either based on a command issued to it or due to a change in the environment it is monitoring are primary events. When the sensors 14 detect changes in their environment and generate an event, the event is "intrinsic." Every intrinsic event has a name and is associated with a zone. A sequence or combination of events create a secondary event. The parameters associated with a secondary event pertain either to the Partitioning aspect (system-defined) or to the Functionality aspect (user-defined). The two types of aspects are described below in more detail.

The appliances may be configured to monitor events or pattern of events (through the web interface) and determine whether certain conditions are fulfilled. The time ordering of events and constraints on the interval of time between events may be specified in a condition. The conditions are attached to a particular one or more zones. On generation of events in a zone, the conditions are examined by the appliances configured for that zone to determine if any action is triggered. A condition in one zone can create an event for another zone. Once a condition is satisfied, one or more operations can follow.

One of the operations may require data or state lookup for completion. This lookup process is accomplished by issuing a query to a database or other storage. The response to the query is then utilized in the operation. The query may address information in the system or third party information. Once the requisite sequence and pattern of events satisfies a condition and, if required, the subsequent information gathering completed, the system will initiate a user-specific task. On completion of a task or as part of a task, record keeping operations, status updates and state changes may be performed and notifications posted. This can take place in a number of ways.

In accordance with the invention, the system will attempt to automatically compose the selected Behaviors (those pick and mapped by the drag-and-drop GUI interface) and, in case of conflicts, the user is requested to arbitrate and select the correct one. This is accomplished by the use of a Behavior attribute called the signature. The signature of a Behavior includes its input/output characteristics as well as other operational parameters. In conjunction with rules for composition based on signatures the system automatically connects the Behaviors, when they are selected and dropped onto a location, with other Behaviors at that location.

For example, consider an application where a specific dock door at a warehouse is meant only for loading paper towels. The application-developer would then drag-and-drop a filter Behavior to that location and then set the range attributes of the Behavior to those corresponding to the codes for paper towels. The developer may set up an alarm notification when paper towels are received at the dock door. In addition, one can also specify the action in case a pallet containing items other than paper towels shows up at the dock door to keep track of how often a pallet shows up incorrectly at this dock door. The developer will then select a counter Behavior and drag and drop it to the same location as the filter behavior. On specifying the type of input it must handle (in this case an alarm event), the system will automatically assign the input of the counter to receive the alarm output of the filter Behavior. Working in this manner, a much more complex system of operations can be fashioned.

Behaviors are easy to add because they do not need knowledge of the compiler modules. A library system manages different behaviors and their parameterization in order to reuse them effectively. The intention is that end-users of the system can create their own behaviors and reuse them, while new aspects are added by specialized personnel who have the expertise to determine when a new aspect should be added and how.

The architecture of the AOP system allows runtime-updates of the system. When the behavior of the distributed system is modified, a new set of compiled code images is generated from the new aspect specification. If the generated code image for a network-element is different from the previous code image, the code distribution server asks the network-element to reload the code image by sending it a reload event. This request prompts the network element to reconnect to the code-distribution server, download the code, and restart itself. In certain cases, it is possible to restart the system by maintaining runtime-information that was generated by the previous code-image. In other cases, when the changes to a zone handler are significant, this may not be possible as it would require generating new information. Both these types of restarts are permissible in the system.

Through the use of aspects and behaviors, the invention allows the creation of a business process or schema that is implemented with varying degrees of automation. Merriam-Webster defines schema to mean, "a diagrammatic presentation; broadly: a structured framework or plan" or "a mental codification of experience that includes a particular organized way of perceiving cognitively and responding to a complex situation or set of stimuli."

The system may provide standard data processing, filtering, and ONS/PML lookup operations. In particular, generic operations include such tasks as duplicate removals when multiple readers may overlap in reading a tag, in the standards based category would fall tasks such as performing ONS/PML lookups in an EPCGlobal compliant fashion. If the workflow/schema includes having to configure parts of the system, then the tasks that gather configuration information for the infrastructure could also be provided. Similarly, Behaviors that are required to interface and communicate with other Business Information systems (implementing functionalities required by Rosseta Net, XML, SOAP among others) are included as part of the library of the web-based configuration system.

In an exemplary chain operation, an object is observed and monitored by radio frequency as it moves through the supply chain in accordance with a business plan. The sequence is to observe the object as it leaves a first observation station (e.g., manufacturer), then observe it appear at a second observation station (a distribution center or possibly one of a set of retail stores), observe it be subjected to processing at the station and, on successful conclusion of the processing, observe it move on to a third station. The choice of stations depends on the planned route selected based on the starting point and the destination.

The time delay between the manufacturer's warehouse and the distribution center may be constrained, as in an SCM pallet that has to get to its destination by a certain time. For example, the pallet may contain certain chemicals or medications with an upcoming utility expiration date, stock transaction settlement, urgently needed documents, etc. The processing at the destination can be conditional based on when it arrives, as can be its next destination (e.g., a late arriving pallet may have to be re-routed). Additionally, logs may have to be updated.

In this example, then, the first event represents the departure of the object from the first station. This event in turn triggers a condition at each of the destinations that now watches for the object's appearance at the next station. The appearance of the object at the destination will, in turn, trigger a receipt process such as billing or checking its condition. Successful completion of this receipt process will then result in it being moved to its next destination (shelf or storage) in its path. In this manner, the object moves through a chain of stations until it reaches the final station. An exception or a deviation from its prescribed plan/route anywhere along the chain can result in generation of reports, which contain information/data necessary for a follow-up and notifications being sent often with remedial actions specified. The remedial action, if any, is provided via triggering a different set of tasks/agents and may include running diagnostics, re-deploying some resources and increasing the resolution of observations around the fail point (akin to zooming in) and also, perhaps, modifying the type of observations (along new axes when possible) to get a better look at the problem.

Aspect-Oriented Program

Figure 3:
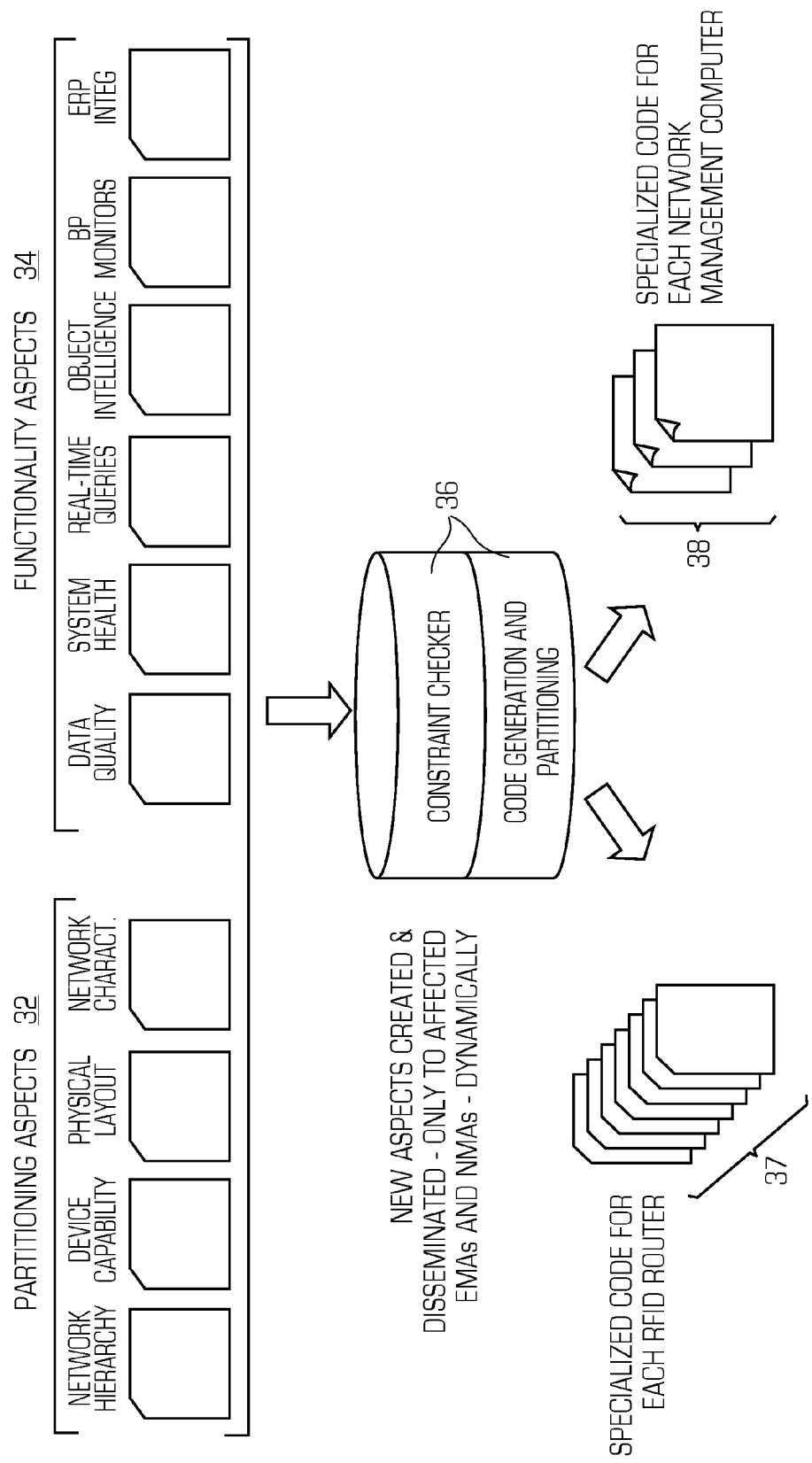
FIG. 3 is a diagram illustrating the aspect oriented program in accordance with the invention that is part of the RFID system.

FIG. 3 is a diagram illustrating the aspect-oriented programming (AOP) 30 that may be used in the system 10 and more specifically in the network management computer 20. The AOP is responsible for the construction, execution, and coordination of a distributed system. The AOP server system consists of four key elements: AOP compilation, Distributed System Boot-up, On-going Operation, and Run-time updates. The AOP system is includes a weaver 36 that takes multiple aspect specifications and merges them into executable code for the system under development.

There are two types of Aspects: Partitioning Aspects 32 and Functionality Aspects 34. The Partitioning Aspects 32 pertain to network and hardware layout and limitations, and are not reconfigurable through the user interface 22. Partitioning Aspects include but are not limited to network hierarchy, device capability, physical layout, and network characteristic. For example, in a warehouse context, the types of sensors that are installed (device capability) and the way the sensors are wired (physical layout) are Partitioning Aspects that can only be changed by someone (e.g., an electrician) who goes to the warehouse, and cannot be changed by an input into the user interface.

When one or more sensors 14 are added to the system 10, the Partitioning aspects may have to be adjusted to incorporate the added sensors 14 unless there is already built-in support for newly added sensors 14. A sensor can also be replaced, e.g., with a different type of sensor. Thus, the sensors 14 can be plug-and-played fairly easily.

The Functionality Aspects 34, in contrast, are controlled through the user interface. Functionality Aspects 34 include but are not limited to data quality, system health, real-time queries, object intelligence, business process (BP) monitors, and enterprise resource planning system (ERP) interrogation. A weaver 36, upon receiving a user input, pulls the Partitioning Aspects that are relevant to the affected Functionality Aspects and generates appropriate code images. For example, if a user reconfigures the system to re-route a package from Route A to Route B, the weaver 36 identifies the sensors that are affected by this change by using the Partitioning Aspects, and generates code images that are directed to the affected sensors. The code images may, for example, direct certain sensors along Route A to send an alert if they detect this package (because that means the re-routing was unsuccessful), and direct certain sensors along Route B to look for the package. The code images are implemented by the RFID router 12 shown in FIG. 1.

Where there are multiple layers of NMAs as shown in the embodiment of FIG. 2, the top-level NMA generates code images not only for the network components downstream but also for itself. The portion of the code images that is generated for itself may be locally stored. In case of a crash, the code images may be retrieved from this local storage or regenerated. The top-level NMA forwards the code images that are not intended for itself to the appropriate network components.

An advantage of the AOP system is that it is user-friendly. In a conventional program, a user who wants to reconfigure the sensors would have to understand how the wires are connected before sending code images to the RFID routers 12. With the AOP system, however, a user can designate the configuration he wants, for example by moving icons on the user interface screen or typing in commands, without worrying about the constraints of the existing hard wiring. The hard wiring aspect is taken care of by the Partitioning aspect. The weaver 36 receives the user input, determines the best way to implement it by taking the Partitioning Aspects into account, and generates appropriate code images for the affected hardware components. This separation of the aspects makes the system 10 efficient and easy to use.

New aspects can be easily added to the system because of the simple way in which propagation and selection are specified. The actual semantics of how the annotation will modify compilation is slightly more involved and requires adding the requisite modules to be added to the compiler. The compiler itself is structured to accommodate these new annotations in order to support an evolution of the all the possible aspects within the system.

The input aspect specification to the AOP system 30 is based upon a hierarchical description of the physical process that is being automated. Based on the Functionality aspect specification received from the user and the Partitioning aspects 34, the weaver 36 generates code images and partitions. A code image 37 is generated for each RFID router, and a code image 38 is generated for each individual network management computer 20. Where there are multiple layers of network management computers, a code image 38 is generated for each network management computer in the "pyramid" of computers.

An aspect specification can be thought of as a collection of annotations around a core syntax tree. The semantics of the individual aspects determine how the annotations are propagated around the core syntax tree. The core syntax of the AOP specification is a tree-specification of the physical spaces in the process. These spaces are referred to as zones. The core syntax specifies a tree of zones. An embodiment of this syntax is as follows:

Zone ::=(Zone-name (Zone*))

Zone-Name ::="[text-character]+"

Each of the Aspect specifications are built around elements specified in this core syntax. For example, for the network hierarchy aspect, the hierarchy of networking elements is mapped onto this zone-tree (henceforth called the Physical Layout). What the aspect specification needs to yield, is a complete description of which zone is mapped to which network element (i.e., a networked computer). In one embodiment of this mapping, this is achieved by providing a sub-tree selection function and a propagation function. The sub-tree selection function selects a sub-tree from the Physical Layout and the propagation function propagates network-hierarchy information along this sub-tree. The network hierarchy aspect is then simply a syntactic specification of the selection and propagation functions. The semantics of this syntactic specification are provided by the compiler.

One embodiment of the syntax of sub-tree selection is

Zsexp ::= (Zone-name*)

| (shallow-subtree of Zsexp)

| (deep-subtree of Zsexp)

| (with-property P Zsexp)

where P is a function in a programming language. In the system 10, this programming language is Scheme. Other methods of specification are possible, such as tree regular-expressions, etc. This sub-tree selection syntax is applicable across all the aspects, enabling a uniform way to deal with aspects. The compiler provides a few built-in propagation functions: Attach, Attach-with-inheritance and Attach-with-synthesis. The Attach function simply attaches the same annotation to each node. Attach-with-inheritance computes the annotation based on the annotation assigned to the parent of the node. Attach-with-synthesis computes the annotation based on the annotations assigned to the children.

The same scheme may be used to specify all aspects. An aspect specification, therefore, is a collection of sub-tree selection and propagation functions that propagate specific annotations.

The network-hierarchy aspect uses the Attach-with-synthesis function to assign network-element annotations. If all the children of a given zone are on the same network element, then that zone is assigned that network element. The propagation is iterated over-and-over until a fixed-point is reached. With this method of aspectual specification, new aspects can easily be added to the system.

Compilation

Figure 4:
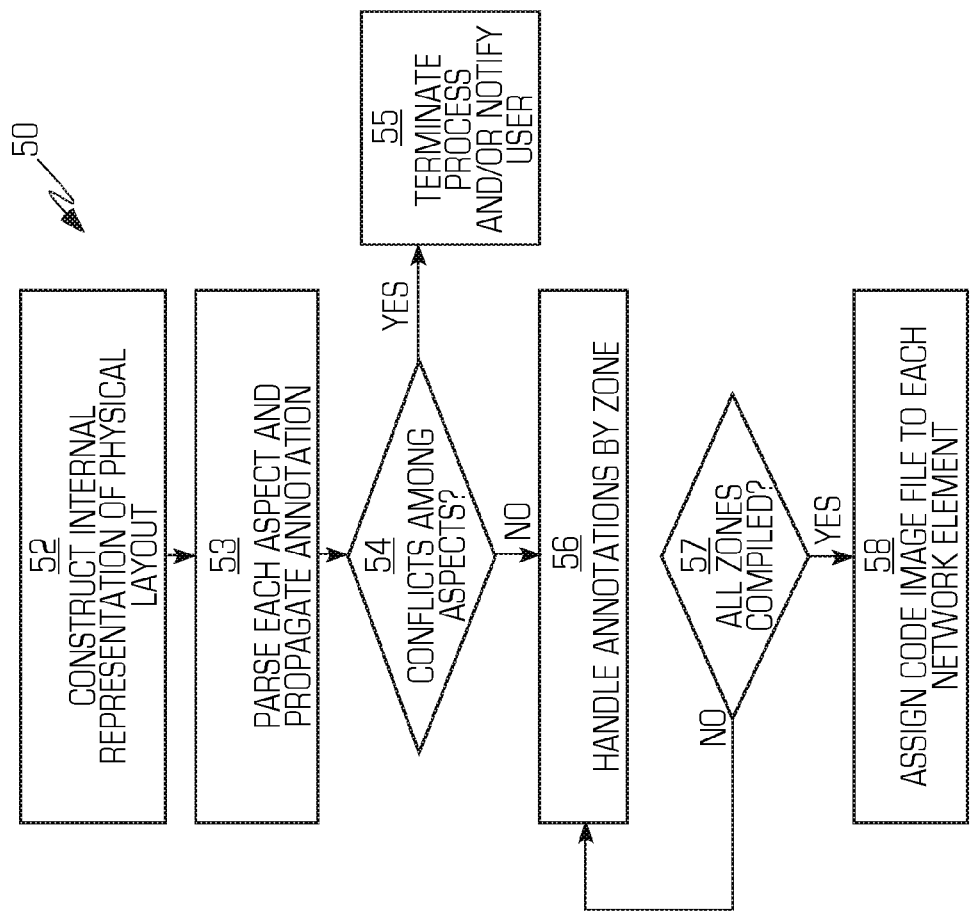
FIG. 4 is a flow diagram depicting the compilation and code generation process performed by the AOP engine in the Network Management Computer.

FIG. 4 is a flow diagram depicting the compilation and code generation process 50 performed by the AOP engine in the Network Management Computer. The AOP engine compiles the data by constructing an internal representation of the Physical Layout (step 52). Then, each of the Aspect specifications is parsed and the annotations are propagated (step 53). If there are any conflicts that get generated by different aspect specifications (step 54), these conflicts are reported and the compilation is terminated (step 55). Once all the annotations are propagated, each zone is compiled into a "zone-handler."

Each zone handler is responsible for handling all the processing related to the relevant zone. This processing begins with managing RFID readers and other devices in the zone, going on to handling events that are generated by these devices and other processes that occur in the zone (such as timers, etc.). These events are handled according to the annotations that were placed on the zone by various aspects (step 56). For example, the system health aspect will cause the zone to record events coming from devices according to a system health criterion, but the Functionality Aspects will require the event to be treated as a decision making unit for overall semantics of the system.

Once the system has compiled all the zones (step 57), code is generated. Each network-element in the system is assigned a Code Image file (step 58). The Code Image file contains code for each zone that resides on that network-element. The Code Image file is generated as a source code, then compiled by traditional means to generate binaries that are distributed to each network-element during boot-up.

System Boot-up and Operation

The distributed system includes a "code distribution" module that is also a network element. When it boots up, it looks up and loads the code image that corresponds to it. Once it is up and running, other network elements can connect to the code distribution module and download their respective code-images. The code-distribution server can selectively ask other network elements to reload code-images if they have changed (due to network or system upgrades). The network elements have a discovery protocol for discovering the code distribution module. Since any newly added network element will be updated by reaching the code distribution module with the discovery protocol, new network elements can be added without preconfiguration.

The code distribution module does not have to be started before other network elements. If other network elements start running first, they will hunt for an available code distribution module until one gets started. Some network elements may be capable of caching the code images. The code distribution server will only send them a new image if it has been updated. In this way, the entire network boots up and configures itself to carry out the functionality that is expected from the fully annotated Physical Layout tree.

Once the system is up and running, the execution expected by each of the individual aspect specification occurs through the coordinated interoperation of the zone-handlers in each network element. For example, system health monitoring is done by heartbeats that are propagated along the network hierarchy. This system health behavior can be modified by changing the aspect specification to require new information to be computed and propagated.

Inter-zone operation is handled by exchanging events between zones. Each zone queues events that will be handled by the zone handler. Network elements can assign events to these queues through a network protocol. Due to the layout of the distributed system being known at compiling, each network element has information about what is being executed in the other zones, and it is possible to route events directly to a chosen network element to achieve the inter-zone operation. This mechanism is used, for example, to send system health information to its immediate parent in the network hierarchy, as required by the system health aspect.

When the changes to the system are drastic, the entire network is restarted and all network elements will download the new code images from the code distribution module.

User Interface

Referring back to FIG. 1, the system 10 includes a graphical user interface 22. A central computer (not shown) contains data and computer instructions/software modules associated with the RFID system 10. The system 10 may further include a web server connected to the central computer that allows the graphical user interface 22 to act as a web-based user interface. The RFID system 10 may be set up and configured (based on the elements shown in FIG. 1) through the web based graphical interface through which the user specifies the attributes for the different aspects of the system. For example, the user may set up and configure the physical components (readers, routers, network management computers) of the network according to their individual needs. The user may also specify a logical partitioning (into zones) of the network and establish a hierarchy as determined by their solution and map it on the physical infrastructure. Once the zones are established, the user may define actions and operations wherein the actions and operations may be defined, created and installed on a zone-by-zone basis. This is further facilitated by the provision of a set of predefined behaviors representing some of the common tasks expected in RFID systems and available through the web-based graphical interface, such as monitoring of shelves and dock-doors but not limited to them. In accordance with the invention, additional behaviors can be quickly developed.

Further, the operations and actions can also be specified using the web-based graphical interface 22. For example, the user may specify the processing of data, the creation of and assignment of conditions to be monitored, the conditions related to data or patterns of data, the conditions related to the operation of any of the devices in the system (health management), the chaining of conditions and events to form more complex sequence of operations and the composing them further such that the final solution can comprise of different dependent processing components which are distributed over the network.

This (web based) user interface 22 also allows the user to quickly enhance their network by adding new components and/or modifying existing ones. A number of additional functions such as automatic health management of the infrastructure, data health management, and information about network characteristics can also be centrally/globally specified. These additional functions and information result in a more robust and a more efficient system operation. The user can, through this interface, observe the operation of the system, probe different aspects of it, and modify operational parameters of individual components or modify parameters of zones or even make global changes.

At the outset, a user has a set of requirements or expectations in terms of performance. The RFID infrastructure can be used to monitor and observe whether they are being met. Unexpected or incorrect operation can be detected and flagged. Observations can be recorded through logging pre-specified information (raw, event statistics etc) and notifications can be enabled. The notifications can be configured to be one or more of logging, email alert, page alert, alarms or exceptions among others. Examples of such applications are, on time performance, looking for defined patterns/distributions (statistics), or regulatory processing. Notification can be the triggering of different levels of alarms when violations or anomalies are detected.

Once the ability to detect events of interest exists, the user may wish to enhance the system to speed up response to anomalous situations. In order to analyze the anomalous or exceptional behavior, additional information relevant to the resolution of the anomaly/exceptional behavior may be needed. This collating of events and contextual data is then made available to the resolving entity for speedier problem resolution. Hence the notification incorporates report generation by culling relevant data from the enterprise (which may be obtained by querying various databases, internal and/or external) and formatting it in support of resolution, possibly with recommendations/hints and forwarding it to the relevant decision makers (humans or software). Enabling the appropriate record keeping helps generate business intelligence at a high resolution.

Using the high-resolution business intelligence, the user can build a more responsive system by automating the more frequent cases based on the resolutions applied at the previous level. This way, the system can evolve in terms of the type of data logging and exception detection to using additional relevant information and finally to making decisions. Iteratively, in this fashion, the user automates away into the normal flow of the business process what were earlier exceptional or anomalous behaviors and hence minimizes human intervention as time goes by.

The goal can be viewed as that of maintaining a certain state by observing certain parameters and responding to changes in them. Other examples of automatically closing the loop include triggering response actions (automatically generating and issuing purchase orders when inventory levels drop below threshold).

This is accomplished by providing the user with the means to define metrics for performance evaluation of their systems and then using the same event processing infrastructure to keep track of performance data. For example, the inputs to the performance evaluation system are the exceptions representing failures in the business process flows. The user can define counter-behaviors and assign them to assertions in different parts of their workflow/schema. A periodic log of the state of the counters is kept to create a performance history. This history can be post-processed to isolate problems and develop refinements. A similar approach can be used to monitor the health and status of the infrastructure. A similar process can be applied to diagnostics and debugging.

An exemplary implementation of the user interface 22 will now be described. The exemplary web-based GUI consists of the System Status Dashboard and the Customization Interface. The System Status Dashboard is the first page that opens after a user logs in. In a preferred embodiment, the system status dashboard may have three panes including a network status pane, an inventory search pane and a query results pane. The Network Status pane has status information on the network elements, such as NMAs, Routers and Sensors. If any of these elements is down, it flashes a system alert. A click on the pane shows the network status table. The Inventory Search pane shows the current inventory status in a table format. The user can search for inventory by Name or by EPC tag, or do an SQL Query.

When the user clicks on a 'Customize RFID' button on the System Status Dashboard page, a Customization Interface is opened in a new window. The Customization Interface is used to set up the RFID installation interactively. On the Customization Interface page there are 5 panes, which are described below:

The CONFIGURATION ICONS pane shows tabbed view of objects that can be manipulated to create the RFID installation. Icons for Objects (Distribution Center (DC), Dock door (DD), shelf), Behaviors (eg. Debug, Mature Data Set) and Devices (RFID Reader) are provided. These icons can be dragged and placed in the layout pane to create new instances of objects, behaviors and devices.

The ZONES pane shows the hierarchy of zone names starting from the root zone, which is the complete RFID Installation. The hierarchy is shown in a tree format. A single click on any zone name in this pane opens up the zone in the layout pane and a right click opens up a menu.

The LAYOUT pane shows the physical layout when a zone is opened. It has information about where each object is placed. Objects can be dragged and placed in the zone layout. Objects added to this zone show up as icons. Each icon can be double-clicked and opened out in the layout pane. A right click on the icon opens up a menu.

The PROPERTIES pane shows the name, behaviors and their parameters for the opened object.

The HELP pane shows context sensitive help.

The web-based GUI may also include a tool bar. The toolbar may have the following button: Clear, Undo, Refresh and Update. The clear button clears the physical layout of the opened object, the undo button permits the most recent clear or delete operation to be reverted. The update button updates the server with the current configuration and then it restarts the server and passes the new script to all the clients that are connected to it. The web-based GUI may also include a status bar that shows the names of icons, if the user places the mouse over them. Now, the aspect oriented server of the system will be described in more detail.

Query

The system may also include a real-time query processing system. The query function is usually started by selecting a Query option on the web-based GUI screen. A separate results pane may show the results of the query. The query option allows the user to query the system or user-selected parts of the system. Some queries are responded to immediately (e.g., report what is visible in zone X) while other queries are "persistent" (e.g., report the next time event Z happens). Queries can address the data or the state of the system. They may access process/workflow profiling data to assist with debugging.

In accordance with the invention, to set up an exemplary system/network in accordance with the invention, a sequence of steps may be performed. In particular, objects from the Configuration Icons pane of the user interface can be dragged and dropped to the Layout pane. The objects may come with certain default behaviors. Next, a DC from the Objects tab is first dragged and placed in the main window. Many such DCs can be placed in different geographical locations nationwide. Each DC comes with a default NMA behavior, which associates it to a particular IP address and location. Then, DDs and shelves can be added to the DC. These objects similarly come with a default Router behavior. Next, readers can be added to the DDs and shelves. These readers automatically detect the router and the port to which they are connected. As the objects are added to the Layout pane, their names get added to the Zones pane and the entire hierarchy can be seen in this pane. Clicking any zone name in this pane, opens it in the Layout pane. Behaviors are added next and they show up as icons in the behavior panel. The behavior panel shows all the behaviors for the opened object. One behavior may depend on other behaviors. If a behavior has certain parameters, a window pops up waiting for the user input. For example, if a Mature Data Set Behavior is added to a DD, the user can enter the maturation delay. A right click on the icon opens a menu, which allows the user to edit parameters for that behavior. Once a DC is set up, it can very easily be managed. The right click menu on each object has copy, paste and delete features. The most powerful feature is the ability to replicate objects. For example, once a DC is set up, it can be copied and pasted at different locations. Thus, it is very easy to move from a pilot installation to a full-scale production.

Business processes tend to be complex and dynamic operations. Thus, it is important for it to be implemented in a system that can evolve with the changing needs. In accordance with the invention, the user can utilize the capabilities of RFID system 10 to progressively improve their insight into the business processes, which then can be applied to create improvements and increase the value that they can accrue from such a system.

While the foregoing has been with reference to a particular embodiment of the invention, it will be appreciated by those skilled in the art that changes in this embodiment may be made without departing from the principles and spirit of the invention.

What is claimed is:

1. A system for communicating with remote devices, the system comprising:
   a primary network management computer coupled to a user interface to receive user instructions and generate code images;
   a sensor router that receives the code images from the primary network management computer and applies the code images to a plurality of sensors, wherein data travels bidirectionally between the primary network management computer and the plurality of sensors according to the user instructions; and
   wherein the user instructions comprise an aspect specification, wherein the aspect specification is a collection of annotations around a core syntax tree.

2. The system of claim 1 further comprising one or more layers of secondary network management computers, wherein the primary network management computer communicates with the sensor router through the secondary network management computers.

3. The system of claim 1, wherein the plurality of sensors comprise different types of sensors that detect different events.

4. The system of claim 1, wherein the user instructions comprise a request for data and the sensor router activates one or more of the plurality of sensors to collect the data.

5. The system of claim 1, wherein the user instructions comprise assignments to one or more of the plurality of sensors to report back upon sensing a predefined event.

6. The system of claim 1, wherein the user instructions comprise a condition and a contingent action, wherein the contingent action is taken by the sensor router if the condition is fulfilled by one of the plurality of sensors.

7. The system of claim 6, wherein the sensor router receives data from the plurality of sensors and forwards the data to the primary network management computer.

8. The system of claim 7, wherein the primary network management computer processes the data from the plurality of sensors and presents it to the user interface in a predefined format.

9. The system of claim 1, wherein the user interface is a web-based graphical user interface.

10. The system of claim 1, wherein the user instructions comprise configuration of the plurality of sensors into subgroups.

11. The system of claim 1, wherein the user instructions pertain to a functionality aspect and the partitioning aspects are stored in a database, and wherein the primary network management computer comprises a weaver that combines the functionality aspect with the partitioning aspects to generate the code images, wherein the partitioning aspects define hard connections between the plurality of sensors, the sensor router, and the primary network management computer.

12. The system of claim 11, wherein the functionality aspect and the partitioning aspects are independently received by the primary network management computer.

13. The system of claim 1, wherein the network management computer generates a set code images for each sensor router.

14. The system of claim 1, wherein the core syntax tree reflects zones in the system.

15. The system of claim 1, wherein the plurality of sensors comprise RFID sensors.

16. The system of claim 1, wherein the type and number of sensors is changeable.

17. The system of claim 1, wherein a subsection of the code images is applied to the primary network management computer.

18. A system for communicating with remote devices, the system comprising:
  a user interface for receiving user instructions;
  a network management system that is coupled to the user interface, the configuration management system generating code images according to the instructions; and
  a plurality of RFID sensors that are remotely coupled to the network management computer and controlled by the code images, wherein the plurality of RFID sensors exchange data with the configuration management system bidirectionally; and
  wherein the configuration management system combines a functionality aspect in the user instructions with partitioning aspects retrieved from a database to generate the code images.

19. The system of claim 18, wherein the RFID sensors are a mixture of different types of RFID sensors.

20. The system of claim 18, wherein the partitioning aspect includes a schema that is transformable into a logical map of sensors, routers, and network management computer nodes.

21. The system of claim 18, wherein one of the code images applies to a subgroup of the RFID sensors.

22. The system of claim 18, wherein some of the code images apply to the network management system.

23. The system of claim 18, wherein the types and total number of RFID sensors in the system is changeable.

24. A method of communicating with remote sensors, the method comprising:
  receiving a user instruction from a user interface;
  generating code images according to the user instruction;
  applying the code images to the sensors to define a condition under which the sensors are to generate a signal;
  processing the signal upon its generation;
  feeding the signal to the user interface; and
  wherein the user instruction is a functionality aspect, further comprising retrieving partitioning aspects from a database and combining the functionality aspect with the partitioning aspects to generate the code images, wherein the partitioning aspect indicates electrical connections among system components.

25. A method of communicating with remote sensors, the method comprising:
  receiving a user instruction from a user interface;
  generating code images according to the user instruction;
  applying the code images to the sensors to define a condition under which the sensors are to generate a signal;
  processing the signal upon its generation;
  feeding the signal to the user interface; and
  dividing the sensors into groups according to the user instruction.

26. The method of claim 24 further comprising changing a total number of sensors to which the code images are applied.

27. The method of claim 24 further comprising partitioning the sensors into multiple layers of zones, wherein the user instruction is zone-specific.

28. The method of claim 27, wherein a zone in the multiple layers of zones has a plurality of subzones.

29. The method of claim 24 further comprising locally storing some of the code images.

30. The method of claim 24 further comprising generating a signal if the sensor fulfills a predetermined condition defined by the user instruction.

31. A method of communicating with remote sensors, the method comprising:
  receiving a user instruction from a user interface;
  generating code images according to the user instruction;
  applying the code images to the sensors to define a condition under which the sensors are to generate a signal;
  processing the signal upon its generation;
  feeding the signal to the user interface;
  parsing the user instruction to extract annotations; and
  propagating the annotations.

32. The method of claim 31 further comprising:
  constructing a physical layout of the sensors and components coupled to the sensors, wherein the physical layout includes multiple zones; and
  compiling the annotations separately for each of the zones.

33. The method of claim 31 further comprising generating a notice to the user interface upon identifying a conflict between annotations.

34. The method of claim 24 further comprising customizing the code images for different types of sensors.

35. The method of claim 24, wherein the sensors comprise RFID sensors.

* * * * *